(12) United States Patent
Shivananda et al.

(10) Patent No.: US 11,140,073 B2
(45) Date of Patent: Oct. 5, 2021

(54) SYSTEM AND METHOD FOR CANARY DEPLOYMENT USING DNS SRV RECORDS

(71) Applicant: Citrix Systems, Inc., Fort Lauderdale, FL (US)

(72) Inventors: Vinay Shivananda, Bengaluru (IN); Raghav S. N, Bengaluru (IN); Aman Chaudhary, Bengaluru (IN); Bhavana Shobhana, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 125 days.

(21) Appl. No.: 16/703,927

(22) Filed: Dec. 5, 2019

(65) Prior Publication Data
US 2021/0176167 A1    Jun. 10, 2021

(51) Int. Cl.
| | | |
|---|---|---|
| *H04L 12/28* | (2006.01) | |
| *H04L 12/725* | (2013.01) | |
| *H04L 12/717* | (2013.01) | |
| *H04L 29/08* | (2006.01) | |
| *H04L 29/12* | (2006.01) | |
| *H04L 12/721* | (2013.01) | |

(52) U.S. Cl.
CPC .......... *H04L 45/3065* (2013.01); *H04L 45/42* (2013.01); *H04L 45/72* (2013.01); *H04L 61/1511* (2013.01); *H04L 67/02* (2013.01); *H04L 67/16* (2013.01)

(58) Field of Classification Search
None
See application file for complete search history.

(56) References Cited

U.S. PATENT DOCUMENTS

| | | | | |
|---|---|---|---|---|
| 8,825,859 | B2 * | 9/2014 | Mutnuru | H04L 69/167 709/226 |
| 8,849,988 | B2 * | 9/2014 | Mutnuru | H04L 43/0817 709/224 |
| 2011/0289185 | A1 * | 11/2011 | Heder | H04L 29/12066 709/217 |
| 2014/0344925 | A1 * | 11/2014 | Muthiah | H04L 67/2804 726/22 |
| 2016/0173452 | A1 * | 6/2016 | Seo | H04L 63/0281 726/12 |
| 2021/0021634 | A1 * | 1/2021 | Babakian | H04L 63/1416 |

* cited by examiner

*Primary Examiner* — Phuongchau Ba Nguyen
(74) *Attorney, Agent, or Firm* — Foley & Lardner LLP

(57) ABSTRACT

Described embodiments provide systems and methods for routing client requests. A device may be arranged intermediary to a plurality of clients and a domain name system (DNS) controller. The device may generate a query for the DNS controller. The query may correspond to a service to be accessed by the clients. The device may receive, from the DNS controller, a response to the query. The response may include a value used by the device to route respective client requests for accessing the service to a corresponding version of a plurality of versions of the service. The device may receive, from a client, a client request for accessing the service. The device may route the client request to one of the versions of the service according to the value included in the response to manage traffic between various versions of the service.

20 Claims, 8 Drawing Sheets

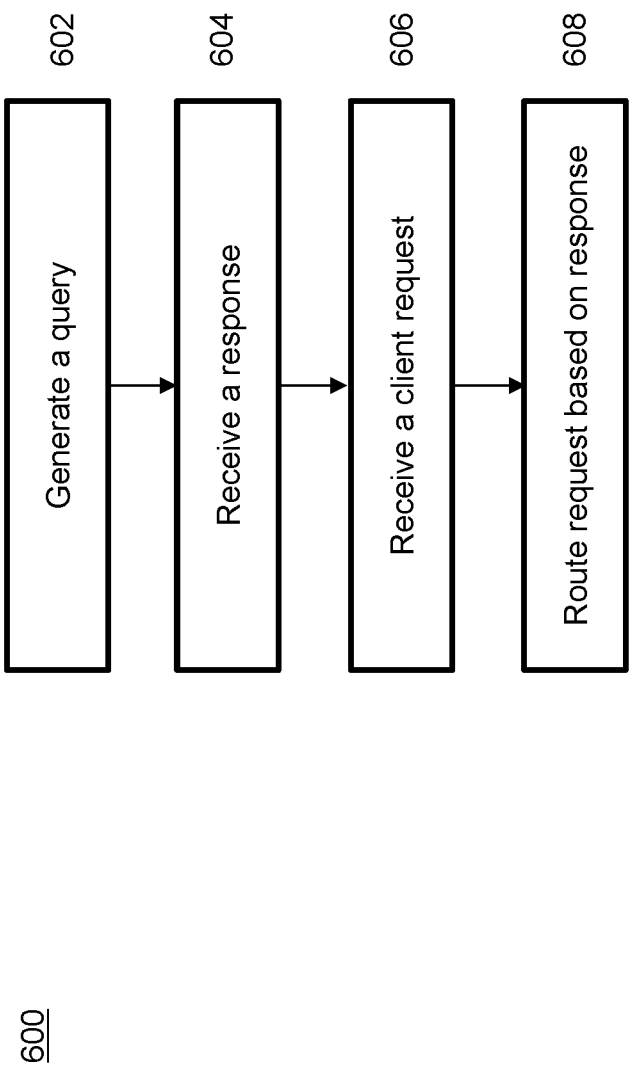

SYSTEM AND METHOD FOR CANARY DEPLOYMENT USING DNS SRV RECORDS

FIELD OF THE DISCLOSURE

The present application generally relates to routing client requests, including but not limited to systems and methods for routing client requests to various version(s) of a service.

BACKGROUND

Various services may be used, accessed, or otherwise provided to users via their respective client devices. Some services may be updated from time to time. For instance, a new version of the service may be deployed for users to access via their client device. As part of the deployment of new versions of services, some new versions may perform at less than desired specifications.

SUMMARY

This Summary is provided to introduce a selection of concepts in a simplified form that is further described below in the Detailed Description. This Summary is not intended to identify key features or essential features, nor is it intended to limit the scope of the claims included herewith.

Systems and methods for routing client requests are described herein. More particularly, the systems and methods described herein leverage service (SRV) records for configuring an intermediary device or appliance (such as an appliance 200 described above) for routing client requests for accessing a service.

An orchestration framework may control the deployment of various versions of services in a computing environment. Some implementations may rely on particular constructs of the orchestration framework to discover the new versions, implementations, updates, or other deployments of such services, and may rely on those same constructs to marshal the deployments in a language that the intermediary device "understands." Some proxy implementations may rely on a representational state transfer (REST) application programming interfaces (APIs) that may be published by an orchestration framework to discover the new deployments. Such REST APIs may vary for endpoint/service discovery and deployment discovery, and may vary across different orchestration frameworks, etc. Hence, reliance on REST APIs for detecting and/or identifying new deployments of services in a computing environment may not be consistent across multiple platforms, as there may not be standards governing the format for REST APIs.

According to the implementations and embodiments described herein, the present disclosure leverages domain name system (DNS) service (SRV) records for discovery of new deployments, implementations, updates, or other versioning of services in a computing environment. The systems and methods described herein may implement a universal language which is agnostic to the orchestration framework and, therefore, does not require any marshalling. By relying on DNS SRV records, which is a language that most intermediary devices and appliances are capable of "understanding," the systems and methods described herein may unify version discovery and deployment—e.g., using DNS SRV records. Leveraging DNS for deployment discovery may assist in easier and more universal adoption of different types of deployments (e.g., staged or progressive deployment, such as a canary deployment, a blue-green deployment, etc.). With DNS SRV-based deployments, any changes to the deployment may be administered without significant delay, and such changes to the deployment may be administered in a consistent manner. Furthermore, the appliances can be configured and reconfigured with limited to no disturbance in delivery of content to the corresponding clients. Various other benefits of the systems and methods described herein will become apparent as follows.

In one aspect, this disclosure is directed to a method. The method may include generating, by a device intermediary to a plurality of clients and a domain name system (DNS) controller, a query for the DNS controller. The query may correspond to a service to be accessed by a plurality of clients. The method may include receiving, by the device from the DNS controller, a response to the query. The response may include a value used by the device to route respective client requests for accessing the service to a corresponding version of a plurality of versions of the service. The method may include receiving, by the device from a client of the plurality of clients, a client request for accessing the service. The method may include routing, by the device, the client request to one of the plurality of versions of the service according to the value included in the response to manage traffic between a first version and a second version of the plurality of versions of the service.

In some embodiments, the response includes a first priority of the first version of the plurality of versions and a second priority of the second version of the plurality of versions. In some embodiments, the device routes each of the client requests for accessing the service to one of the first version or the second version, based on at least one of the first priority of the first version or the second priority of the second version. In some embodiments, the response includes a first weight of the first version of the plurality of versions and a second weight of the second version of the plurality of versions. In some embodiments, the device routes a first portion of the client requests to the first version, and a second portion of the plurality of client requests to the second version based on at least one of the first weight or the second weight.

In some embodiments, the method further includes receiving, by the device from the DNS controller, an update to the first weight based on one or more monitored conditions of the first version or the second versions. The method may further include routing, by the device, a second plurality of client requests for accessing the service based on the received update to the first weight. In some embodiments, the device routes the second plurality of client requests for accessing the service to increase traffic routed to the second version based on the received update to the first weight. In some embodiments, the response is a first response, the value is a first value, and the method further includes monitoring, by the device, one or more conditions of one of the plurality of versions. The method may further include transmitting, by the device, the monitored one or more conditions to the DNS controller. The DNS controller may be configured to transmit a second response including a second value based on the monitored one or more conditions. In some embodiments, the response includes a target domain, a port, a priority, and a weight, and the value is at least one of the priority or the weight. In some embodiments, the query is a service (SRV) query for the DNS controller, and the response is an SRV response from the DNS controller.

In another aspect, this disclosure is directed to a system. The system may include a device intermediary to a plurality of clients and a domain name system (DNS) controller. The device may be configured to generate a query for the DNS controller. The query may correspond to a service to be accessed by a plurality of clients. The device may be configured to receive, from the DNS controller, a response to the query. The response may include a value used by the device to route respective client requests for accessing the service to a corresponding version of a plurality of versions of the service. The device may be configured to receive, from a client of the plurality of clients, a client request for accessing the service. The device may be configured to route the client request to one of the plurality of versions of the service according to the value included in the response to manage traffic between a first version and a second version of the plurality of versions of the service.

In some embodiments, the response includes a first priority of the first version of the plurality of versions and a second priority of the second version of the plurality of versions. In some embodiments, the device routes each of the client requests for accessing the service to one of the first version, or the second version based on at least one of the first priority of the first version, or the second priority of the second version. In some embodiments, the response includes a first weight of the first version of the plurality of versions and a second weight of the second version of the plurality of versions. In some embodiments, the device routes a first portion of the client requests to the first version and a second portion of the plurality of client requests to the second version based on at least one of the first weight or the second weight.

In some embodiments, the device is further configured to receive, from the DNS controller, an update to the first weight based on one or more monitored conditions of the first version or the second version. The device may further be configured to route a second plurality of client requests for accessing the service based on the received update to the first weight. In some embodiments, the device routes the second plurality of client requests for accessing the service to increase traffic routed to the second version based on the received update to the first weight. In some embodiments, the response is a first response, the value is a first value, and the device is further configured to monitor one or more conditions of one of the plurality of versions. The device may further be configured to transmit the monitored one or more conditions to the DNS controller. The DNS controller may be configured to transmit a second response, including a second value based on the monitored one or more conditions. In some embodiments, the response includes a target domain, a port, a priority, and a weight, and the value is at least one of the priority or the weight. In some embodiments, the query is a service (SRV) query for the DNS controller, and the response is an SRV response from the DNS controller.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, with emphasis instead being placed upon illustrating embodiments, principles, and concepts. The drawings are not intended to limit the scope of the claims included herewith.

FIG. 6 is a flow diagram of a method for routing client requests, in accordance with an illustrative embodiment.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for providing a clustered appliance architecture environment;

Section D describes embodiments of systems and methods for providing a clustered appliance architecture environment; and Section E describes embodiments of systems and methods for routing client requests.

A. Network and Computing Environment

Figure 1A:
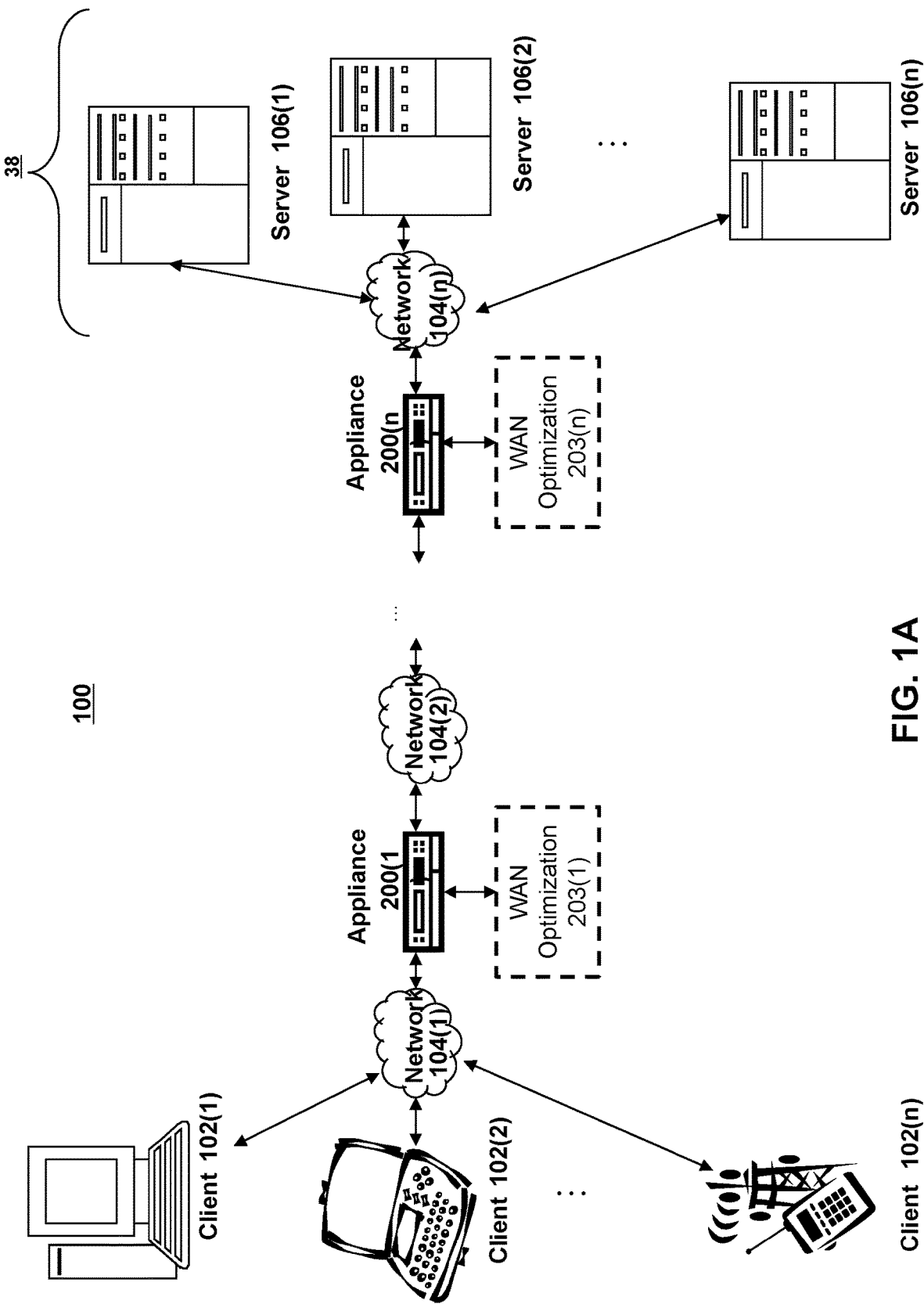
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
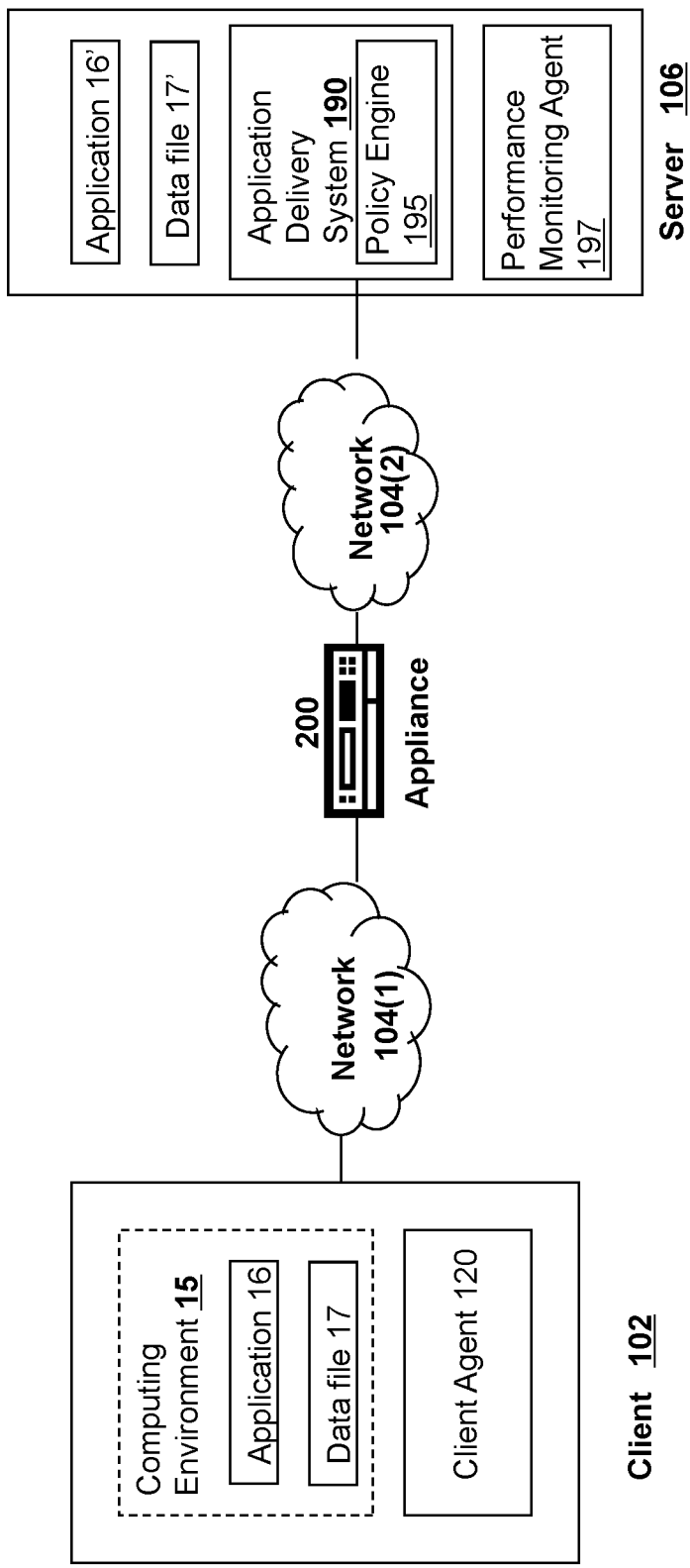
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include a client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
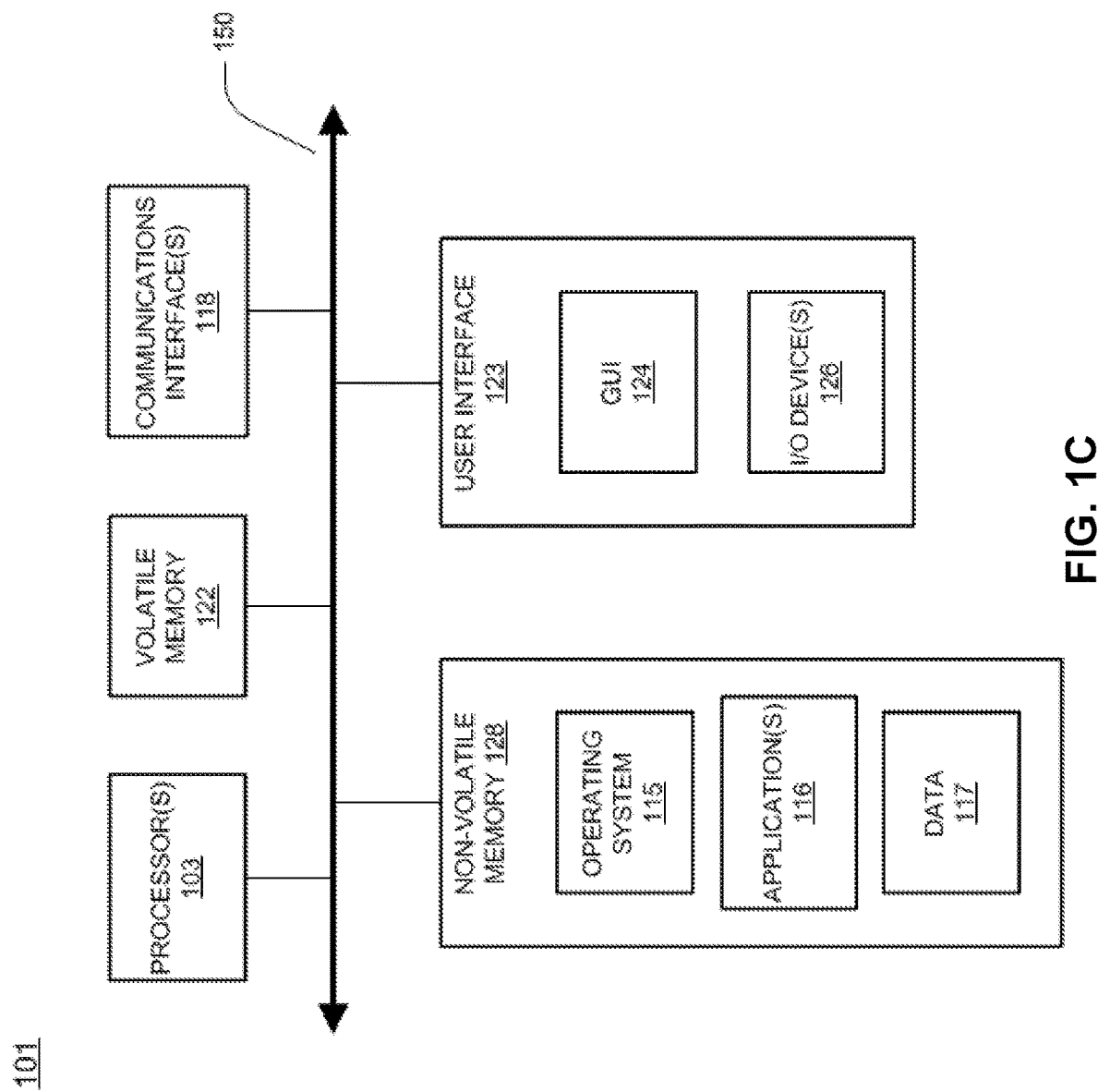
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
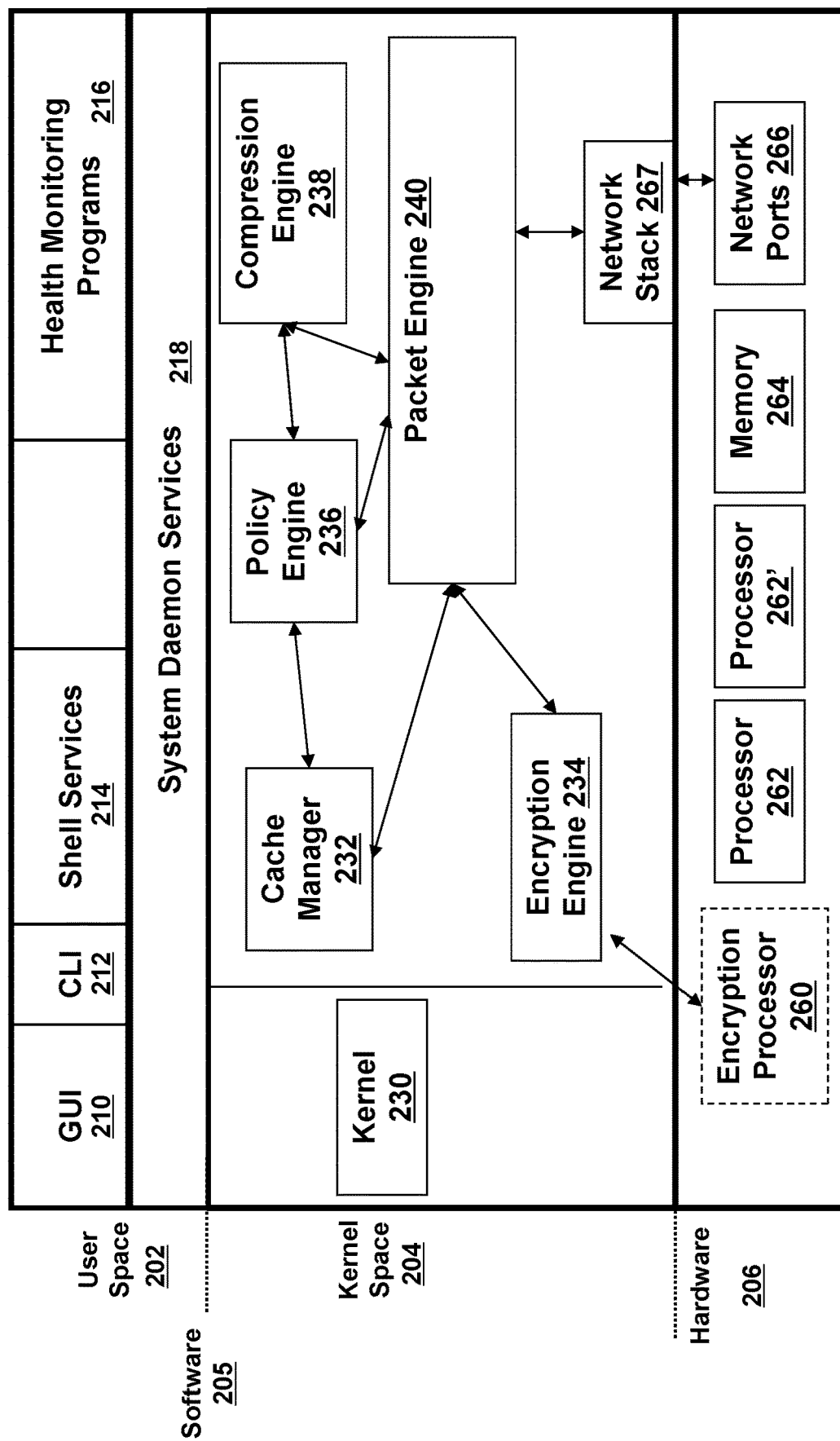
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Virtualizing an Application Delivery Controller

Figure 3:
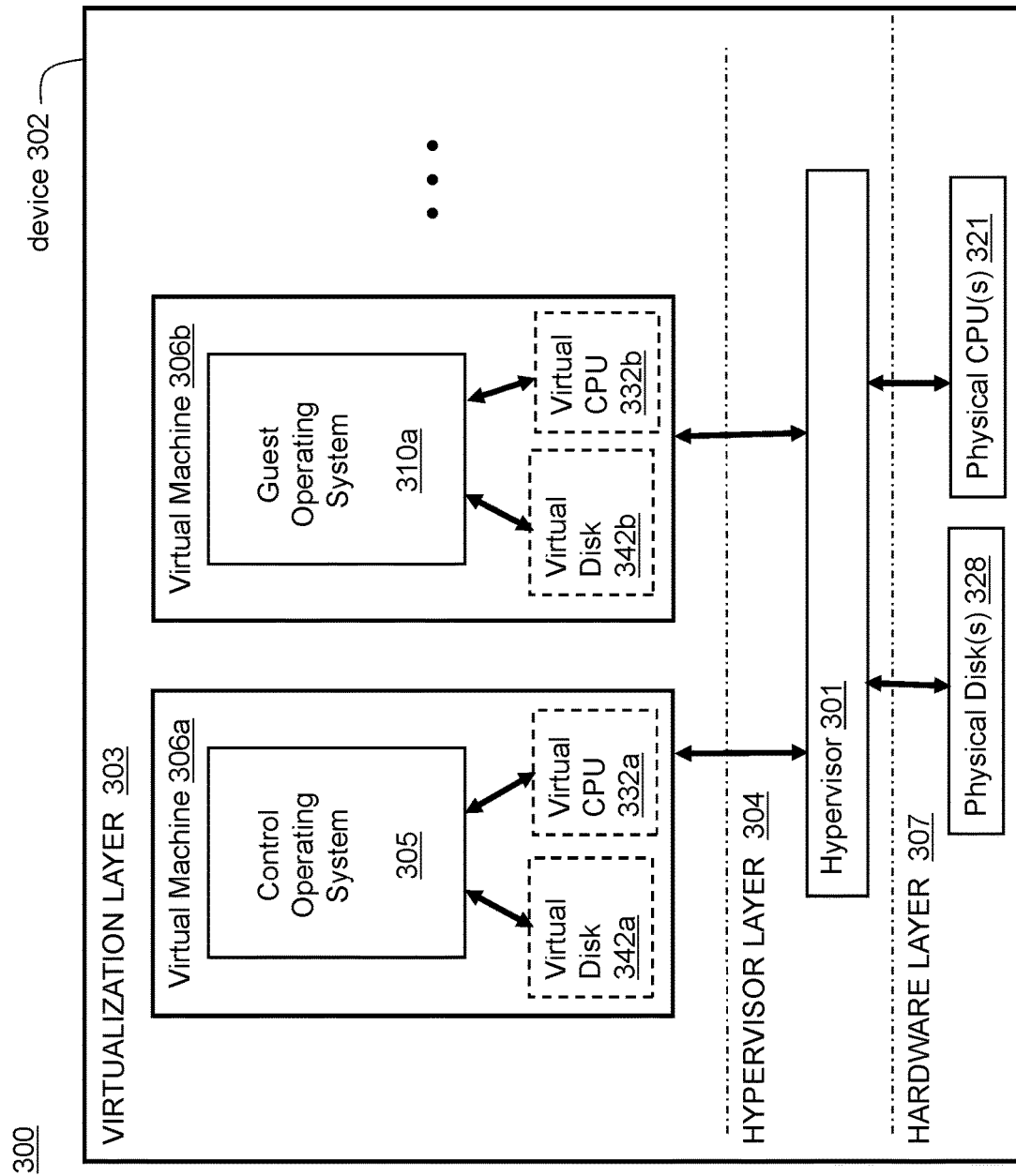
FIG. 3 is a block diagram of a virtualization environment, in accordance with an illustrative embodiment.

Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
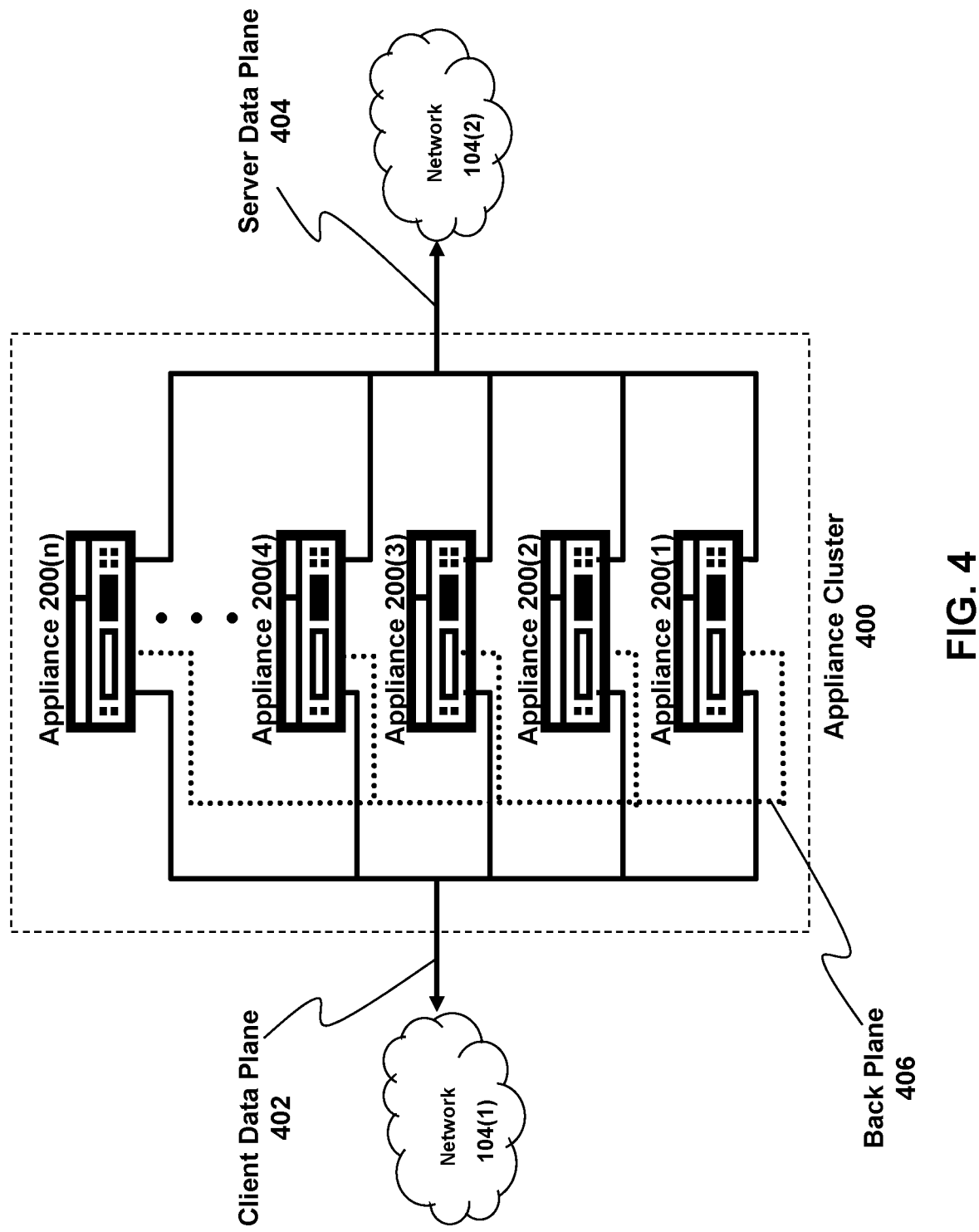
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Systems and Methods for Routing Client Requests

Systems and methods for routing client requests are described herein. More particularly, the systems and methods described herein leverage SRV records for configuring an intermediary device or appliance (such as an appliance 200 described above) for routing client requests to access a service.

An orchestration framework may control deployment of various versions of services in a computing environment. Some implementations may rely on particular constructs of the orchestration framework to discover the new versions, implementations, updates, or other deployments of such services and may rely on those same constructs to marshal the deployments in a language that the intermediary device "understands." Some proxy implementations may rely on a representational state transfer (REST) application programming interfaces (APIs) that may be published by an orchestration framework to discover the new deployments. Such REST APIs may vary for endpoint/service discovery and deployment discovery, may vary across different orchestration frameworks, etc. Hence, Hence, reliance on REST APIs for detecting and/or identifying new deployments of services in a computing environment may not be consistent across multiple platforms, as there may not be standards governing the format for REST APIs.

According to the implementations and embodiments described herein, the present disclosure leverages domain name system (DNS) service (SRV) records for discovery of new deployments, implementations, updates, or other versioning of services in a computing environment. The systems and methods described herein may implement a universal language which is agnostic to the orchestration framework and, therefore, does not require any marshalling. By relying on DNS SRV records, which is a language that most intermediary devices and appliances are capable of "understanding," the systems and methods described herein may unify version discovery and deployment—e.g., using DNS SRV records. Leveraging DNS for deployment discovery may assist in easier and more universal adoption of different types of deployments (e.g., staged or progressive deployment, such as a canary deployment, a blue-green deployment, etc.). With DNS SRV-based deployments, any changes to the deployment may be administered without significant delay, and such changes to the deployment may be administered in a consistent manner. Furthermore, the appliances can be configured and reconfigured with limited to no disturbance in delivery of content to the corresponding clients. Various other benefits of the systems and methods described herein will become apparent as follows.

Figure 5:
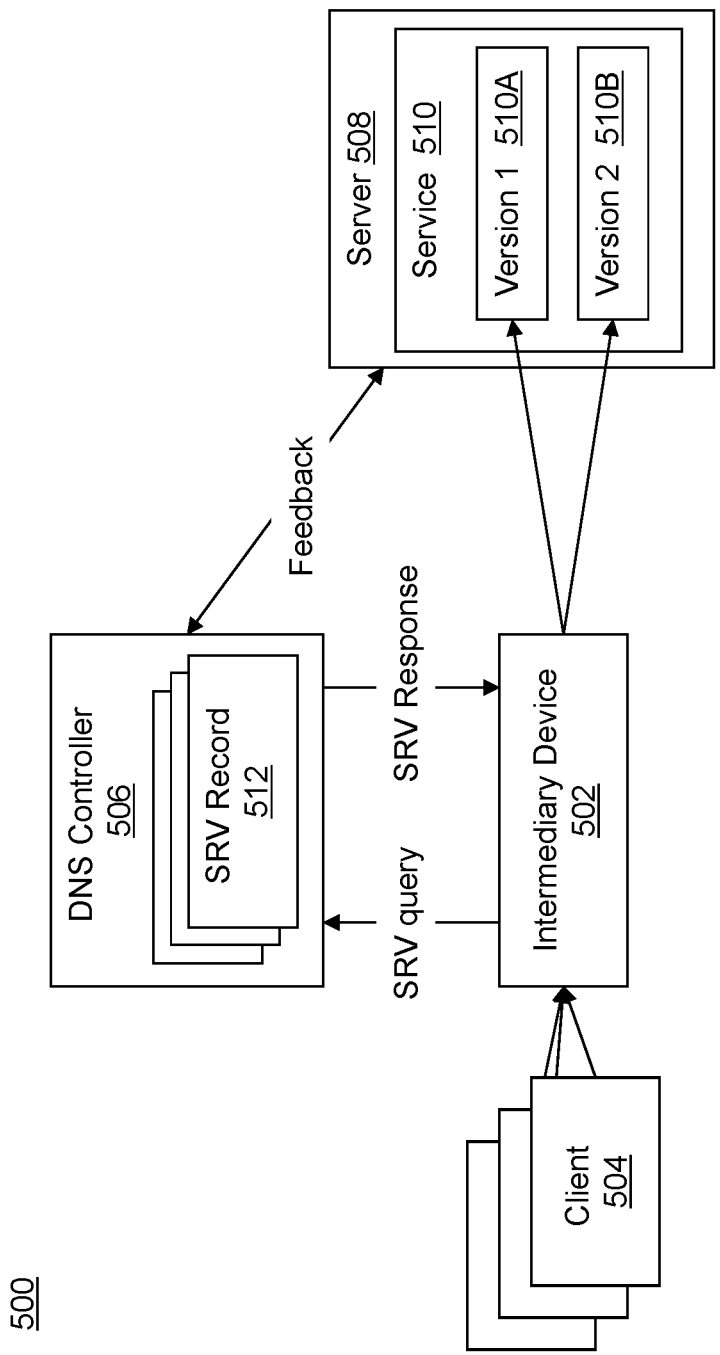
FIG. 5 is a block diagram of a system for routing client requests, in accordance with an illustrative embodiment.

Referring now to FIG. 5, depicted is a block diagram of a system 500 for routing client requests, according to an illustrative embodiment. The system 500 is shown to include an intermediary device 502 arranged between a plurality of clients 504 and a domain name system (DNS) controller 506. The intermediary device 502 may be configured to generate a DNS query for the DNS controller 506. The DNS query may correspond to a service 510 to be accessed by the clients 504. The DNS controller 506 may be configured to receive the DNS query, and generate a DNS response for the intermediary device 502. The intermediary device 502 may be configured to receive the DNS response from the DNS controller 506. The DNS response may include a value that is used by the intermediary device 502 to route respective client requests for accessing the service 510 to a corresponding version of the service 510. The intermediary device 502 may be configured to receive client requests from the client(s) 504. The intermediary device 502 may be configured to route the client requests to one of the plurality of versions of the service 510 according to the value from the DNS response from the DNS controller 506. In this regard, intermediary device 502 may manage traffic between, for instance, a first version 510A and a second version 510B of the plurality of versions of the service 510, based on DNS responses from the DNS controller 506, as described in greater detail below.

The systems and methods of the present solution may be implemented in any type or form of device, including clients, servers or appliances described above with reference to FIG. 1A-FIG. 4. For instance, the intermediary device 502 may be implemented as embodied upon or otherwise incorporated into an appliance 200 described above with reference to FIG. 2-FIG. 4. The clients 504 may be similar in some respects to the clients 102 described above with respect to FIG. 1A-FIG. 1B. The service 510 is shown as being hosted, executed on, or otherwise embodied on a server 508, which may be similar in some respects to the server 106 described above with respect to FIG. 1A-FIG. 1B. In some implementations, the DNS controller 506 may be embodied upon, incorporated into, or a component of an appliance 200, a server 106, etc. In other words, the intermediary device 502, the clients 504, the DNS controller 506, and/or server 508 may include or incorporate components and devices similar in some aspects to those described above with reference to FIG. 1C, such as a memory and/or one or more processors operatively coupled to the memory. The present systems and methods may be implemented in any embodiments or aspects of the appliances or devices described herein.

As shown in FIG. 5, the system 500 may include a server 508. The server 508 is shown to be communicably coupled to the intermediary device 502. In some implementations, the server 508 may be communicably coupled to the intermediary device 502 via various communication interfaces (e.g., such as those shown in FIG. 1C and described above). The server 508 may also be communicably coupled to the DNS controller 506 via similar communications interfaces. While shown as a single server 508, in some implementations, the system 500 may include a plurality of servers 508. The server(s) 508 may include, maintain, or otherwise host one or more services 510. The services 510 may be various types or forms of software that may be provided to the clients 504. In some embodiments, the service(s) 510 may be or include remote applications, software as a service (SaaS) applications, etc. The service(s) 510 may enterprise specific (e.g., services which are specific to a single enterprise, developed by the enterprise, etc.), accessible by a plurality of different enterprises, etc. In some implementations, the service(s) 510 hosted on a server 508 may be a plurality of micro-services. Each of the micro-services may be dedicated to performing a single or a group of tasks. Together, a group of micro-services may form a service 510 which is provided to a client 504.

In some implementations, the server 508 may include various versions of a service 510. For instance, as shown in FIG. 5, the server 508 may include a plurality of versions of the service 510 including a first version 510A and a second version 510B of a service 510. While two versions are shown, the server 508 may include any number of versions of a service 510. An administrator of the service 510 (such as a developer) may manage deployment of such version of the service 510. For instance, the administrator may upload, transmit, send, provide, or otherwise deploy a second version 510B of the service 510 at the server 508 (e.g., responsive to developing the second version 510B, responsive to beta testing the second version 510B, etc.). The server 508 may thus host a plurality of versions of the service 510. As described in greater detail below, the DNS controller 506 may be configured to control deployment of the versions of the service 510 using values in responses to queries from intermediary devices 502.

The system 500 may include the DNS controller 506. The DNS controller 506 may be communicably coupled to the intermediary device 502 and/or the server 508. The DNS controller 506 may be configured to generate, maintain, establish, create, or otherwise include service (SRV) records 512 corresponding to service(s) 510 hosted on various servers 508. The DNS controller 506 may be configured to generate SRV records 512 for services 510 hosted on the server 508 as new services 510 (and new versions of previous services 510) are deployed at the server 508. The server 508 may be configured to register services 510 with the DNS controller 506 when the services 510 are deployed at the server 508. Hence, as new services 510 are registered with the DNS controller 506, the DNS controller 506 may generate new SRV records 512.

The DNS controller 506 may be configured to generate SRV records 512 for each of the versions 510A, 510B of the service 510. The DNS controller 506 may ping the server 508 (e.g., periodically, responsive to occurrences of various conditions, etc.) to determine whether new versions of a service 510 have been implemented, included, or otherwise deployed at the server 508. The DNS controller 506 may be configured to generate the SRV records 512 based on data corresponding to the service 510. For instance, the DNS controller 506 may be configured to structure the SRV records 512 to include various parameters. The parameters may include a domain name for a service 510, a port corresponding to the service 510, a weight for the service 510, and a priority for the service 510. In some implementations, the weight and/or the priority for the service 510 may be used for allocating and/or routing traffic to different versions of a service 510.

The DNS controller 506 may be configured to provide, set, determine, or otherwise generate a value for the SRV records 512. In some implementations, the DNS controller 506 may be configured to generate the value for the SRV records 512, to control routing traffic to different versions of a service 510. For instance, the DNS controller 506 may be configured to generate the value for an SRV record 512 corresponding to a first version 510A of a service 510 based on deployment of a second version 510B of the service 510. In some embodiments, the DNS controller 506 may be configured to generate the value based on performance of the first and second versions 510A, 510B. The DNS controller 506 may be configured to receive performance feedback from the server 508 corresponding to execution of the first and second version 510A, 510B. The DNS controller 506 may be configured to receive the performance feedback from the server 506 directly from the intermediary device 502.

The DNS controller 506 may be configured to generate the value by updating a priority for an SRV record 512. The priority may be used to indicate the priority of one version of the service 510 relative to another version of the service 510. In some embodiments, the DNS controller 506 may be configured to set the priority for the first version 510A of the service 510 relative to the second version 510B of the service 510. The DNS controller 506 may be configured to set the priority based on an input from a developer of the service 510. The DNS controller 506 may be configured to set the priority to a default priority based on a new version of the service 510 being registered with the DNS controller 506. For instance, when a new version of the service 510 is deployed at the server 508, the DNS controller 506 may automatically set a priority of the new version to a default priority such that network traffic is routed to the new version of the service 510. The DNS controller 506 may be configured to set the priority of the second version 510B higher than the priority of the first version 510A. The DNS controller 506 may be configured to set the priority of the second version 510B to indicate the second version 510B is to receive network traffic from the intermediary device 502. In some embodiments, the DNS controller 506 may be configured to update the priority based on feedback corresponding to execution of the versions 510A, 510B. For instance, the DNS controller 506 may be configured to set the priority of the second version 510B higher than the first version 510A, such that network traffic is routed to the second version 510B.

The DNS controller 506 may be configured to receive feedback corresponding to execution of the second version 510B of the service 510. The DNS controller 506 may be configured to update the priority based on the feedback corresponding to execution of the second version 510B of the service 510. For instance, the DNS controller 506 may be configured to decrease the priority of the second version 510B responsive to the feedback indicating unsatisfactory execution of the second version 510B (e.g., metrics corresponding to execution of the second version 510B being outside of metrics corresponding to execution of the first version 510A). Similarly, the DNS controller 506 may be configured to maintain the priority of the second version 510B responsive to the feedback indicating satisfactory execution of the second version 510B (e.g., metrics corresponding to execution of the second version 510B being substantially the same as metrics corresponding to execution of the first version 510A, metrics corresponding to the second version 510B exceeding metrics corresponding to execution of the first version 510A, etc.).

The DNS controller 506 may be configured to generate the value by updating the weight for an SRV record 512. The weight may be used to indicate a proportion of traffic to be routed to one version of the service 510 relative to another version of the service 510. In some embodiments, the DNS controller 506 may be configured to set the weight for the first version 510A of the service 510 relative to the second version 510B of the service 510. The DNS controller 506 may be configured to set the weight of the first or second version 510A, 510B of the service 510 based on an input from a developer of the service 510. The DNS controller 506 may be configured to set the weight to a default weight based on a new version of the service 510 being registered with the DNS controller 506. For instance, when a new version of the service 510 is deployed at the server 508, the DNS controller 506 may automatically set a weight of the new version to a default priority such that a small portion of the network traffic is routed to the new version of the service 510 (as compared to the previous version of the service 510). As described in greater detail below, the DNS controller 506 may update the weight for the new version to increase network traffic to the new version over time.

The DNS controller 506 may be configured to set the weight of the second version 510B higher than the weight of the first version 510A. The DNS controller 506 may be configured to set the weight of the second version 510B to indicate the second version 510B is to receive a higher portion of network traffic from the intermediary device 502 than the first version 510A of the service 510. In some embodiments, the DNS controller 506 may be configured to update the weight based on feedback corresponding to execution of the versions 510A, 510B. For instance, the DNS controller 506 may be configured to set the weight of the second version 510B higher than the first version 510A such that more network traffic is routed to the second version 510B.

The DNS controller 506 may be configured to receive feedback corresponding to execution of the second version 510B of the service 510. The DNS controller 506 may be configured to update the weight based on the feedback corresponding to execution of the second version 510B of the service 510. For instance, the DNS controller 506 may be configured to decrease the weight of the second version 510B responsive to the feedback indicating unsatisfactory execution of the second version 510B (e.g., metrics corresponding to execution of the second version 510B being outside of metrics corresponding to execution of the first version 510A). Similarly, the DNS controller 506 may be configured to increase the weight of the second version 510B responsive to the feedback indicating satisfactory execution of the second version 510B (e.g., metrics corresponding to execution of the second version 510B being substantially the same as metrics corresponding to execution of the first version 510A, metrics corresponding to the second version 510B exceeding metrics corresponding to execution of the first version 510A, etc.).

As described in greater detail below, the DNS controller 506 may be configured to transmit, send, or otherwise provide an SRV response to an intermediary device 502 (e.g., responsive to receiving an SRV query from the intermediary device 502). The DNS controller 506 may be configured to provide the value (e.g., the weight and/or priority) to the intermediary device 502 to control network traffic between respective versions of the service 510.

The system 500 is shown to include an intermediary device 502. The intermediary device 502 may be arranged intermediary to the clients 504 and a DNS controller 506. The intermediary device 502 may be similar in some respects to the appliance 200 described above with reference to FIG. 2 and FIG. 4. The intermediary device 502 may be communicably coupled to the client(s) 504, DNS controller 506, and server(s) 508. The intermediary device 502 may facilitate communications between the client(s) 504 and server(s) 508. The intermediary device 502 may be configured to generate queries for the DNS controller 506. The intermediary device 502 may be configured to generate the queries for the DNS controller 506 at various intervals (e.g., once a minute, once an hour, once a day, once a week, etc.) responsive to one or more conditions (e.g., responsive to receiving a client request for a service 510, responsive to receiving a notification or ping from a server 508 hosting a service 510, responsive to receiving a notification or ping from a device corresponding to an administrator or service developer, etc.). The intermediary device 502 may be configured to generate a query corresponding to a service 510 for managing network traffic between different versions of the service 510, as described in greater detail below.

In some embodiments, the request may be a service (SRV) query. The SRV query may include, for instance, a target domain for the service 510, among other information. The intermediary device 502 may be configured to generate the SRV query for the DNS controller 506. The intermediary device 502 may be configured to generate the SRV query to request the parameters from the SRV record 512 corresponding to the service 510 from the DNS controller 506. The intermediary device 502 may be configured to transmit the SRV query to the DNS controller 506. The intermediary device 502 may be configured transmit the SRV query to the DNS controller 506 via a wireless or wired communications link between the DNS controller 506 and intermediary device 502. The DNS controller 506 may perform a look-up using data from the SRV query (e.g., the target domain, for instance) in the SRV records 512 to identify a corresponding SRV record 512. The DNS controller 506 may be configured to transmit a SRV response corresponding to the SRV request. The SRV response may include, for instance, the target domain, the port, the weight, the priority, etc. In some embodiments, the SRV response may include data corresponding to a plurality of SRV records for the same target domain. For instance, the DNS controller 506 may be configured to include data corresponding to the SRV record 512 for the first version 510A and data corresponding to the SRV record 512 for the second version 510B of the service 510. The intermediary device 502 may be configured to use the values from the SRV response to control network traffic between the versions of the service 510.

The intermediary device 502 may be configured to receive the SRV response from the DNS controller 506. The SRV response may include a value used by the intermediary device 502 to route client requests to versions of a service 510. The intermediary device 502 may be configured to parse the SRV response from the DNS controller 506 to identify value(s) corresponding to services 510 that are accessible by clients 504. The intermediary device 502 may be configured to use the identified values for generating a configuration setting for the intermediary device 502. The configuration setting may be a setting which configures network routing of client requests to respective versions of the service 510.

In some instances, the SRV response may include a weight of a first version 510A and a weight of a second version 510B of the service. The intermediary device 502 may be configured to identify the weight of the first version 510A and the weight of the second version 510B. The intermediary device 502 may be configured to determine a proportion, ratio, etc. of the weight of the first version 510A and the weight of the second version 510B. The intermediary device 502 may be configured to generate a configuration setting which allocates a portion of client requests to the first version 510A and another portion of client requests to the second version 510B (e.g., based on the proportion/ratio of the weights). The intermediary device 502 may be configured to distribute, transmit, send, or otherwise provide client requests to the first and second versions 510A, 510B (e.g., at the port specified in their corresponding SRV records) in accordance with the ratio of the weights. For instance, the proportion of the weight of the second version 510B to the weight of the first version 510A may be 2/1. The intermediary device 502 may be configured to generate a configuration setting for the intermediary device 502 to allocate two-thirds of client requests to the second version 510B and one third of the client requests to the first version 510A.

In some instances, the SRV response may include a priority of a first version 510A and a priority of a second version 510B of the service. The intermediary device 502 may be configured to identify the priority of the first version 510A and the priority of the second version 510B. The intermediary device 502 may be configured to determine which of the first version 510A and the second version 510B has a higher priority. The intermediary device 502 may be configured to generate a configuration setting which allocates each of the client requests to the first version 510A or the second version 510B based on the version 510A, 510B having the highest priority. The intermediary device 502 may be configured to distribute, transmit, send, or otherwise provide client requests to one of the first or second versions 510A, 510B (e.g., at the port specified in their corresponding SRV records) having the highest priority.

The system 500 is shown to include a plurality of clients 504. The clients 504 may be similar to the clients 102 described above. The clients 504 may be personal computers, laptops, desktops, tablets, mobile devices, etc. The clients 504 may be configured to access services 510 hosted on the servers 508. The clients 504 may be configured to access the services 510 by generating client requests for the intermediary device 502 (e.g., client requests to access the service 510). The clients 504 may be configured to generate the client requests when a user selects a service 510, launches a service 510, the client 504 is turned on, etc. The client request may include, for instance, a target domain (e.g., a domain corresponding to the service 510 endpoint). The clients 504 may be configured to transmit, send, or otherwise provide the client requests to the intermediary device 502 for routing to a corresponding version of the service 510.

The intermediary device 502 may be configured to receive client requests from the clients 504 for accessing the service 510. The intermediary device 502 may be configured to determine a configuration setting corresponding to the target domain specified in the client request. For instance, the intermediary device 502 may be configured to determine whether the target domain specified in a particular client request corresponds to a configuration setting for an SRV record 512. The intermediary device 502 may be configured to route the client requests based on the configuration setting. For instance, where the configuration setting specifies routing a portion of client requests to a first version 510A and a portion of client requests to a second version 510B (e.g., based on the respective weights from the SRV response from the DNS controller 506), the intermediary device 502 may be configured to route the client requests received from the clients 504 based on the corresponding configuration setting. As another example, where the configuration setting specifies routing each of the client requests to one of the versions 510 of the service (e.g., based on the respective priority from the SRV response from the DNS controller 506), the intermediary device 502 may be configured to route the client requests received from the clients 504 based on the corresponding configuration setting.

In some embodiments, the intermediary device 502 may be configured to monitor the execution of the corresponding version(s) 510A, 510B of the service 510. The intermediary device 502 may be configured to monitor execution of the versions 510A, 510B to determine various conditions of the execution. The conditions may include, for instance, error rate, latency, traffic rate, etc. The intermediary device 502 may be configured to transmit, send, or otherwise provide the conditions to the DNS controller 506 as feedback. In some embodiments, the server 508 may be configured to monitor the execution of the corresponding version(s) 510A, 510B of the service 510 to determine conditions of the execution. The server 508 may be configured to transmit, send, or otherwise provide the conditions to the DNS controller 506 as feedback. In these and other embodiments, the DNS controller 506 may be configured to receive feedback corresponding to execution of the version(s) 510A, 510B of the service 510.

The DNS controller 506 may be configured to maintain, include, or otherwise access thresholds corresponding to execution of version(s) 510A, 510B of the service 510. For instance, the DNS controller 506 may be configured to access thresholds corresponding to conditions for execution of a previous version of the service 510. The DNS controller 506 may be configured to compare the thresholds corresponding to a previous version of the service 510 with monitored conditions corresponding to execution of a new version of the service 510. The DNS controller 506 may be configured to update the SRV records based on the feedback corresponding to the monitored conditions corresponding to execution of the version(s) 510A, 510B, based on the comparison to the thresholds, etc.

The DNS controller 506 may be configured to update the SRV records to increase the weight of (or increase the priority of) the second version 510B relative to the first version 510A where the monitored conditions of the second version 510B satisfy thresholds corresponding to the execution of the first version 510A. The monitored conditions of the second version 510B may satisfy the thresholds where the conditions corresponding to execution of the second version 510B are substantially the same as (or are improved with respect to) execution of the first version 510A (e.g., decreases in or substantially the same error rate, decreases in or substantially the same latency, improved or substantially the same traffic rates, etc.). Similarly, the DNS controller 506 may be configured to update the SRV records to decrease the weight of (or decrease the priority of) the second version 510B relative to the first version 510A when the monitored conditions of the second version 510B do not satisfy thresholds corresponding to the execution of the first version 510A. The monitored conditions of the second version 510B may not satisfy the thresholds where the conditions corresponding to execution of the second version 510B are not improved with respect to execution of the first version 510A (e.g., increases in error rate, increases in latency, decreases in traffic rate, etc.).

Similar to the first SRV response, the DNS controller 506 may be configured to send a second SRV response to the intermediary device 502. The DNS controller 506 may be configured to send the second SRV response in response to an SRV query, when the DNS controller 506 updates the SRV record 512, etc. The intermediary device 502 may be configured to route subsequent client requests according to the updates to the weight/priority as indicated in the SRV response. The intermediary device 502 may be configured to update the configuration setting and transmit subsequent client requests according to the updated configuration setting.

Referring to FIG. 6, depicted is a flowchart showing a method 600 of routing client requests according to an illustrative embodiment. The method 600 (including various steps included therein) may be implemented by one or more of the components shown in FIG. 5 and described above, such as the intermediary device 502, the client(s) 504, the DNS controller 506, and/or server 508. As a brief overview, at step 602, a device generates a query. At step 604, the device receives a response. At step 606, the device receives a client request. At step 608, the device routes the request according to the response.

At step 602, and in some embodiments, a device generates a query. In some embodiments, the device is intermediary to a plurality of clients and a domain name system (DNS) controller. The device may generate a query for the DNS controller. The query may correspond to a service to be accessed by a plurality of clients. The device may generate and transmit the query to the DNS controller. The device may generate the query at various intervals (e.g., once a minute, once an hour, once a day, once a week, etc.). In this regard, the device may generate the query independent of client requests corresponding to the service. The device may generate the query responsive to receiving a client request for the corresponding service. In some embodiments, the query may be a service (SRV) query. The SRV query may query the DNS controller for information corresponding to the service. The device may query the DNS controller for information corresponding to the service to determine whether there are any updates or new versions for the service.

At step 604, and in some embodiments, the device receives a response. In some embodiments, the device may receive a response to the query from the DNS controller. The response may include a value used by the device to route respective client requests for accessing the service to a corresponding version of a plurality of versions of the service. The DNS controller may identify the value based on data included in an SRV record maintained by the DNS controller for the service. The DNS controller may use the query (e.g., generated at step 602) for identifying the SRV record corresponding to the service. For instance, the SRV record may include a target domain, and the query may include a target domain. The DNS controller may perform a look-up function using the target domain from the query for identifying a target domain in a corresponding SRV record. The DNS controller may generate and transmit a response using the identified SRV record. The response may be an SRV response including data from the SRV records.

In some embodiments, the response includes a target domain, a port, a priority, and a weight. The DNS controller may generate, set, or otherwise assign the priority and/or the weight to modify, regulate, or otherwise control the network traffic between versions of a service provided to the client(s). The DNS controller may assign a value to the priority and/or weight for the SRV record. The DNS controller may assign the value to the priority and/or weight for the SRV record when a new version of a service corresponding to the service is deployed, based on an input from an administrator corresponding to the service, based on feedback corresponding to monitored conditions of the execution of the service, etc. The DNS controller may assign the value to the priority and/or weight to increase traffic to one version while correspondingly decreasing traffic to another version. As described in greater detail below, the DNS controller may update the priority weight over time (e.g., based on feedback corresponding to monitored conditions of execution of one or more version(s) of the service).

The response may be or include data corresponding to a plurality of SRV records for respective versions of the service. For instance, the response may include data corresponding to an SRV record for a first version of the service and data corresponding to an SRV record for a second version of the same service. In some embodiments, the response includes a first priority of a first version and a second priority of a second version. In some embodiments, the response includes a first weight of the first version and a second weight of the second version. As described in greater detail below, the respective priorities and/or respective weights may be used (e.g., by the intermediary device) for routing network traffic between the first and second version of the service.

At step 606, and in some embodiments, the device receives a client request. In some embodiments, the device may receive a client request for accessing the service from a client of the plurality of clients. The device may receive the client request over a network which connects the device to the client(s). In some embodiments, the device may receive a plurality of client requests. The device may determine a port of a server for which to route the client requests received at step 606, as described in greater detail below.

At step 608, and in some embodiments, the device routes the request according to the response. In some embodiments, the device may route the request to one of the plurality of versions of the service according to the value included in the response to manage traffic between the first version and the second version. The device may route the request according to the value included in the response. In some embodiments, the device routes each of the requests for accessing the service to one of the first version or the second version based on at least one of the first priority of the first version or the second priority of the second version. For instance, where the response includes a priority of the second version which is higher than a priority of the first version, the device may route each of the client requests to a port corresponding to the second version (as the second version has a higher priority). In some embodiments, the device routes a first portion of the requests to the first version and a second portion of the plurality of requests to the second version based on at least one of the first weight or the second weight. For instance, where the response includes a weight of the second version and a weight of the first version, the device may route a portion of client requests to the port corresponding to the second version and a portion of client requests to the port corresponding to the first version. The portions for the first and second version may be in proportion to the weight of the second version to the weight of the first version.

In some embodiments, the response (e.g., received at step 604) may be a first response and the value may be a first value. The device may monitor one or more conditions of one (or more) of the plurality of versions. For instance, where the device routes client requests in proportion to the weights, the device may monitor conditions corresponding to executing the respective versions. The device may transmit the monitored one or more conditions to the DNS controller. The DNS controller may be configured to transmit a second response including a second value based on the monitored one or more conditions.

In some embodiments, the device may receive an update to the first weight from the DNS controller. The device may receive the update based on one or more monitored conditions of the first version or the second version. The device may monitor the conditions of the first or second version, the server hosting the version(s) of the service may monitor the conditions, the DNS controller may monitor the conditions, etc. The device may route a second plurality of requests for accessing the service based on the received update to the first weight. In some embodiments, the device routes the second plurality of requests for accessing the service, to increase traffic routed to the second version based on the received update to the first weight.

Various elements, which are described herein in the context of one or more embodiments, may be provided separately or in any suitable sub-combination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method, comprising:
   generating, by a device intermediary to a plurality of clients and a domain name system (DNS) controller, a query for the DNS controller, the query corresponding to a service to be accessed by a plurality of clients;
   receiving, by the device from the DNS controller, a response to the query, the response including a value used by the device to route respective client requests for accessing the service to a corresponding version of a plurality of versions of the service;
   receiving, by the device from a client of the plurality of clients, a client request for accessing the service; and
   routing, by the device, the client request to one of the plurality of versions of the service according to the value included in the response to manage traffic between a first version and a second version of the plurality of versions of the service.

2. The method of claim 1, wherein the response includes a first priority of the first version of the plurality of versions and a second priority of the second version of the plurality of versions.

3. The method of claim 2, wherein the device routes each of the client requests for accessing the service to one of the first version or the second version based on at least one of the first priority of the first version or the second priority of the second version.

4. The method of claim 1, wherein the response includes a first weight of the first version of the plurality of versions and a second weight of the second version of the plurality of versions.

5. The method of claim 4, wherein the device routes a first portion of the client requests to the first version and a second portion of the plurality of client requests to the second version based on at least one of the first weight or the second weight.

6. The method of claim 5, further comprising:
receiving, by the device from the DNS controller, an update to the first weight based on one or more monitored conditions of the first version or the second version; and
routing, by the device, a second plurality of client requests for accessing the service based on the received update to the first weight.

7. The method of claim 6, wherein the device routes the second plurality of client requests for accessing the service, to increase traffic routed to the second version based on the received update to the first weight.

8. The method of claim 1, wherein the response is a first response, the value is a first value and further comprising:
monitoring, by the device, one or more conditions of one of the plurality of versions; and
transmitting, by the device, the monitored one or more conditions to the DNS controller, the DNS controller configured to transmit a second response including a second value based on the monitored one or more conditions.

9. The method of claim 1, wherein the response includes a target domain, a port, a priority, and a weight, and wherein the value is at least one of the priority or the weight.

10. The method of claim 1, wherein the query is a service (SRV) query for the DNS controller, and wherein the response is an SRV response from the DNS controller.

11. A system, comprising:
a device intermediary to a plurality of clients and a domain name system (DNS) controller, the device configured to:
generate a query for the DNS controller, the query corresponding to a service to be accessed by a plurality of clients;
receive, from the DNS controller, a response to the query, the response including a value used by the device to route respective client requests for accessing the service to a corresponding version of a plurality of versions of the service;
receive, from a client of the plurality of clients, a client request for accessing the service; and
route the client request to one of the plurality of versions of the service according to the value included in the response to manage traffic between a first version and a second version of the plurality of versions of the service.

12. The system of claim 11, wherein the response includes a first priority of the first version of the plurality of versions and a second priority of the second version of the plurality of versions.

13. The system of claim 12, wherein the device routes each of the client requests for accessing the service to one of the first version or the second version based on at least one of the first priority of the first version or the second priority of the second version.

14. The system of claim 11, wherein the response includes a first weight of the first version of the plurality of versions and a second weight of the second version of the plurality of versions.

15. The system of claim 14, wherein the device routes a first portion of the client requests to the first version and a second portion of the plurality of client requests to the second version based on at least one of the first weight or the second weight.

16. The system of claim 15, wherein the device is further configured to:
receive, from the DNS controller, an update to the first weight based on one or more monitored conditions of the first version or the second version; and
route a second plurality of client requests for accessing the service based on the received update to the first weight.

17. The system of claim 16, wherein the device routes the second plurality of client requests for accessing the service, to increase traffic routed to the second version based on the received update to the first weight.

18. The system of claim 11, wherein the response is a first response, the value is a first value and wherein the device is further configured to:
monitor one or more conditions of one of the plurality of versions; and
transmit the monitored one or more conditions to the DNS controller, the DNS controller configured to transmit a second response including a second value based on the monitored one or more conditions.

19. The system of claim 11, wherein the response includes a target domain, a port, a priority, and a weight, and wherein the value is at least one of the priority or the weight.

20. The system of claim 11, wherein the query is a service (SRV) query for the DNS controller, and wherein the response is an SRV response from the DNS controller.

* * * * *